(12) United States Patent
Manger et al.

(10) Patent No.: US 11,692,606 B2
(45) Date of Patent: Jul. 4, 2023

(54) VIBRATION DAMPER HAVING ADJUSTABLE DAMPING VALVE

(71) Applicant: ZF FRIEDRICHSHAFEN AG, Friedrichshafen (DE)

(72) Inventors: Thomas Manger, Wasserlosen (DE); Lukas Ruhmann, Memmelsdorf (DE); Stefan Schmitt, Gochsheim (DE); Manuel Gumpert, Hofheim (DE); Thomas Solf, Sulzheim (DE); Bernd Zeissner, Volkach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 337 days.

(21) Appl. No.: 17/051,989

(22) PCT Filed: Apr. 29, 2019

(86) PCT No.: PCT/EP2019/060858
§ 371 (c)(1),
(2) Date: Oct. 30, 2020

(87) PCT Pub. No.: WO2019/211215
PCT Pub. Date: Nov. 7, 2019

(65) Prior Publication Data
US 2021/0054900 A1     Feb. 25, 2021

(30) Foreign Application Priority Data
May 3, 2018   (DE) ..................... 10 2018 206 840.2

(51) Int. Cl.
*B60G 17/08*     (2006.01)
*F16F 9/46*      (2006.01)
(Continued)

(52) U.S. Cl.
CPC ............... *F16F 9/46* (2013.01); *F16F 9/34* (2013.01); *B60G 13/005* (2013.01);
(Continued)

(58) Field of Classification Search
CPC ... F16F 9/34; F16F 9/46; F16F 9/3242; B60G 13/005; B60G 2204/128; B60G 2500/10
(Continued)

(56) References Cited

U.S. PATENT DOCUMENTS 3,941,401 A * 3/1976 Allison ..................... F16F 9/54
                                                 280/124.108
4,724,938 A * 2/1988 Horvath .................. F16F 9/364
                                                 73/11.04
(Continued)

FOREIGN PATENT DOCUMENTS

DE          4007261        9/1991
DE         19815214       12/1998
(Continued)

*Primary Examiner* — Christopher P Schwartz
(74) *Attorney, Agent, or Firm* — Cozen O'Connor

(57) ABSTRACT

A vibration damper includes at least one adjustable damping valve having an outer housing connected to one end of an outer receptacle of the vibration damper. A longitudinal axis of the adjustable damping valve and a longitudinal axis of the vibration damper run parallel. The outer housing of the adjustable damping valve has a clamping surface for an axle connection part.

9 Claims, 2 Drawing Sheets

(51) Int. Cl.
*F16F 9/34* (2006.01)
*B60G 13/00* (2006.01)
*F16F 9/32* (2006.01)

(52) U.S. Cl.
CPC .... *B60G 2204/128* (2013.01); *B60G 2500/10* (2013.01); *F16F 9/3242* (2013.01)

(58) Field of Classification Search
USPC ..... 188/315, 322.14, 322.15, 322.19, 321.11
See application file for complete search history.

(56) References Cited

U.S. PATENT DOCUMENTS 8,196,942 B2 * 6/2012 Heeren ................ B60G 13/006
280/124.1
2009/0242339 A1 10/2009 Nakadate et al.

FOREIGN PATENT DOCUMENTS

| DE | 19815215 | 12/1998 | | |
| DE | 19733622 | 2/1999 | | |
| DE | 102005060955 | 1/2007 | | |
| DE | 102015200348 | 7/2016 | | |
| FR | 2560325 | 8/1985 | | |
| GB | 2137730 A | * 10/1984 | ........... | B60G 13/006 |
| GB | 2154700 A | * 9/1985 | ......... | B60G 17/0152 |
| GB | 2164723 | 3/1986 | | |
| JP | H1073141 | 3/1998 | | |

* cited by examiner

VIBRATION DAMPER HAVING ADJUSTABLE DAMPING VALVE

CROSS REFERENCE TO RELATED APPLICATIONS

This is a U.S. national stage of Application No. PCT/EP2019/060858 filed Apr. 29, 2019. Priority is claimed on German Application No. DE 10 2018 206 840.2 filed May 3, 2018 the content of which is incorporated herein by reference.

BACKGROUND OF THE INVENTION

1. Field of the Invention

The invention is directed to a vibration damper with adjustable damping valve.

2. Description of Related Art

An installation space problem very often occurs in a vibration damper with adjustable damping valve particularly when the vibration damper is combined with an air spring or is constructed as a suspension strut with a spring cup for a supporting spring. In principle, the adjustable damping valve could also be formed as a piston valve. However, more and more frequently a separately adjustable damping valve is provided for both movement directions of the vibration damper. An installation space problem occurs particularly in this case.

DE 40 07 261 A1 describes a vibration damper with adjustable damping force in which the adjustable damping valve is mounted at the bottom side at an end of an outer receptacle tube. The damping valve is shown in a sectional view in FIG. 1 of DE 40 07 261 A1. It can be seen that the adjustable damping valve at the bottom is at least partially received by the outer receptacle tube. Only the area of a magnetic coil projects out of the receptacle tube and is protected by a cap. It is not apparent from FIG. 1 how the vibration damper is connected to an axle.

In the construction according to DE 198 15 214 A1, the outer receptacle tube receives the adjustable damping valve and also has a connection member (FIG. 3). The variant according to FIG. 2 shows a valve housing which is connected to the receptacle tube. A ring joint is fastened to an end face of the valve housing for connecting to a vehicle axle.

SUMMARY OF THE INVENTION

It is an object of one aspect of the present invention to further develop a vibration damper with an adjustable damping valve arranged at the bottom such that the vibration damper is also connectable to a vehicle axle with a pressed-on connection part.

According to one aspect of the invention, a longitudinal axis of the adjustable damping valve and a longitudinal axis of the vibration damper run parallel, and the outer housing of the adjustable damping valve has a clamping surface for an axle connection part.

The installation space enclosed by the axle connection part serves to receive the adjustable damping valve. The wall of the housing is dimensioned such that the occurring forces can be safely absorbed. Owing to the orientation of the longitudinal axis, the housing can be formed by a tubular base body which can be produced comparatively simply and inexpensively.

In a further advantageous configuration, the outer housing has an axial stop for the axle connection part so that a safety function is provided for the axle connection via the outer housing.

According to one aspect of the invention, the outer housing is welded to the outer receptacle tube, and a weld seam is formed on the rear side relative to the axial stop for the axle connection part. The thickness of the stop is filled out by the weld seam so that the stop obtains greater stability.

The housing has a radial indentation in which a cap of the adjustable damping valve engages so that the axle connection part has a simple geometry and a favorable transfer of forces from the axle connection part to the housing. The cap is not loaded by the forces acting on the axle connection part. Consequently, the cap can be constructed as a simple plastic cap.

In addition, the cap is protected in that the axle connection part has an annular base that covers a portion of the cap.

It is further provided that the adjustable damping valve is held by a clamping ring, and the axial preloading of the clamping ring fixes the adjustable damping valve to a shoulder of the outer housing. Accordingly, the entire adjustable damping valve can be preassembled independently from the other component parts of the vibration damper.

With regard to an optimized use of installation space, a rear side of the shoulder forms a supporting surface for a bottom valve body of the vibration damper. In this way, a clamping chain can be realized with an inner cylinder and a piston rod guide so that a simple closure technique can be carried out for the outer receptacle.

For an optimal flow of the damping medium located in the vibration damper, the bottom valve body has a central through-opening between a work chamber and the adjustable damping valve. Elaborate channels for the connection of the work chamber are done away with.

In this connection, a stop disk for a check valve is connected to the bottom valve body through the through-opening via a sleeve portion. The sleeve portion can accordingly form a hollow rivet for fastening the stop disk.

A further step for a simple connection of the work chamber to the adjustable damping valve consists in that the bottom valve body has a connection piece having a flow connection and a holding connection to the adjustable damping valve.

BRIEF DESCRIPTION OF THE DRAWINGS

The invention will be described in more detail referring to the following description of the drawings. The drawings show.

DETAILED DESCRIPTION OF THE PRESENTLY PREFERRED EMBODIMENTS

Figure 1:
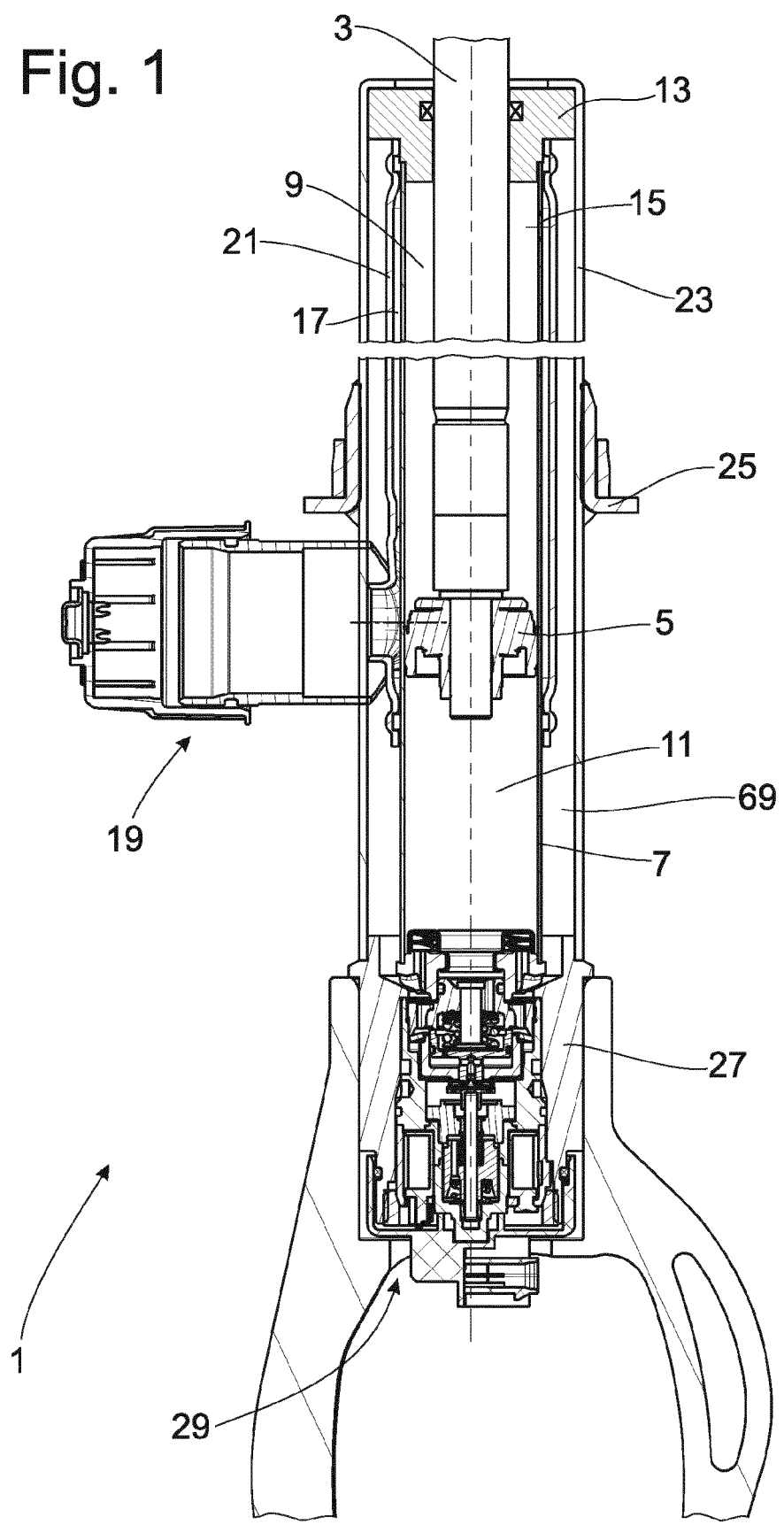
FIG. 1 is a section through a vibration damper.

FIG. 1 shows a complete section through a vibration damper 1 which has an axially movable piston rod 3 with a piston 5 in an inner cylinder 7. The piston 5 can be optionally outfitted with damping valves and divides the cylinder 7 into a work chamber 9 on the piston rod side and a work chamber 11 remote of the piston rod. The work chamber 9 on the piston rod side is closed at the end by a piston rod guide 13. The work chamber 9 on the piston rod side and the work chamber 11 remote of the piston rod are both completely filled with a damping medium, generally a hydraulic damping medium.

The inner cylinder 7 can have an overflow orifice 15, which connects the piston rod side work chamber 9 with a fluid connection 17 to an adjustable damping valve 19. The fluid connection 17 is formed by an intermediate tube 21, which is sealingly pressed onto an outer lateral surface of the inner cylinder 7. The inner cylinder 7 and the intermediate tube 21 are enveloped by an outer receptacle 23 extending from the piston rod guide 13 to the opposite end. Add-on parts such as, e.g., a spring cup 25 or the adjustable damping valve 19, can be fastened to the outer receptacle tube.

The end of the inner cylinder 7 and of the outer receptacle 23 remote of the piston rod guide 13 is closed by a housing 27 for an adjustable damping valve 29. The damping valve 19 only serves to demonstrate the cramped installation spaces when two damping valves are to be arranged at the outer receptacle. The invention can also reasonably be applied in principle when only one adjustable damping valve 29 is to be used.

Figure 2:
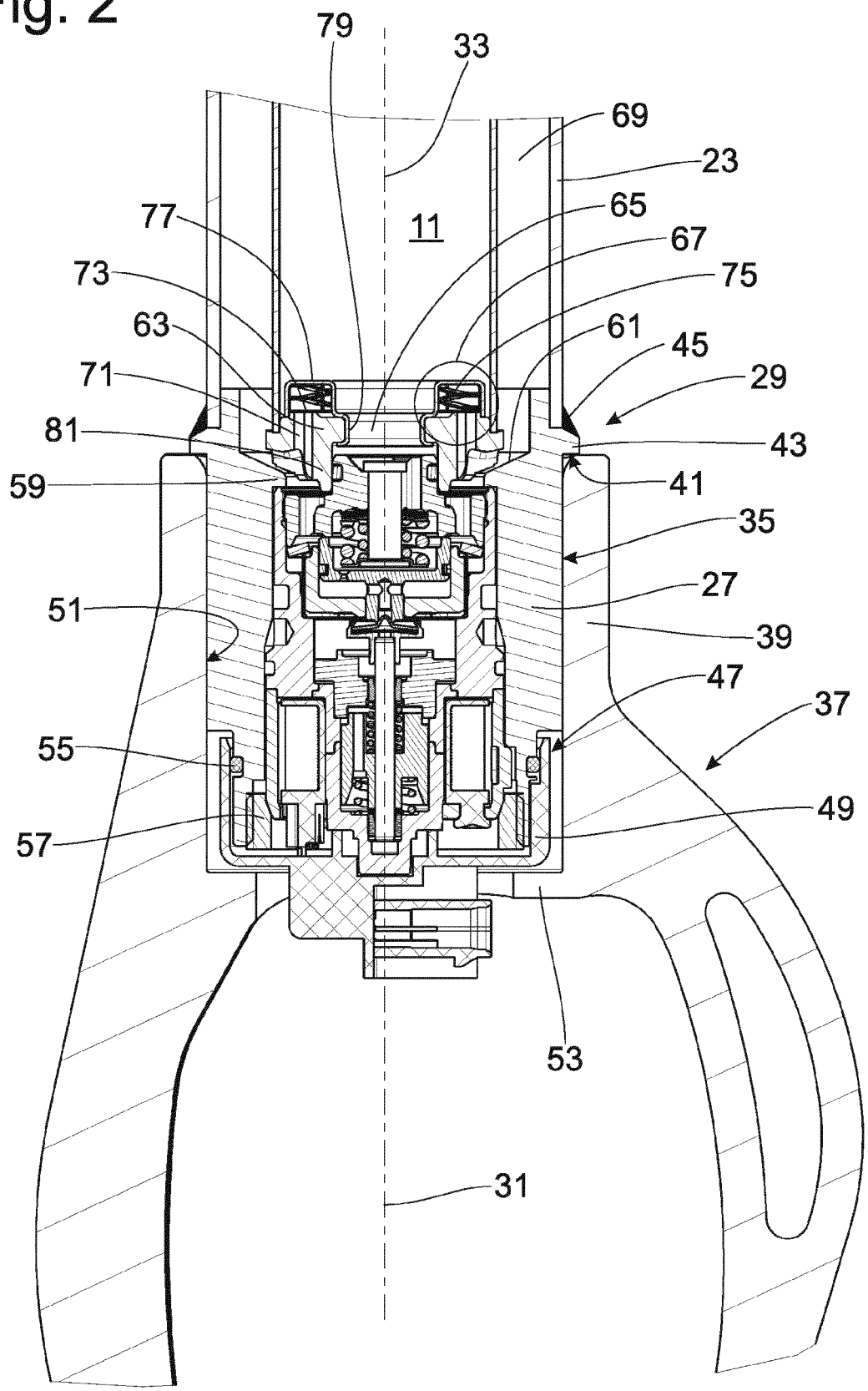
FIG. 2 is a partial view referring to FIG. 1.

As can be seen particularly from FIG. 2, a longitudinal axis 31 of the adjustable damping valve 29 and a longitudinal axis 33 of the vibration damper 1 run parallel. It will be appreciated that to run parallel can also be coextensive.

The outer housing 27 of the adjustable damping valve 29 has a clamping surface 35 for an axle connection part 37. In this specific case, this is a fork with a slotted clamping sleeve 39 that is preloaded by a clamping screw, not shown, on the clamping surface 35. This way of fastening an axle connection part 37 is known, for example, from DE 198 15 215 A1.

The outer housing 27 has an axial stop 41 formed by a circumferential collar 43 for defined positioning of the axle connection part 37 in longitudinal direction.

The outer housing 29 is connected to the outer receptacle tube 23, again by a weld seam 45, and accordingly forms a lengthening of the outer receptacle 23. The weld seam 45 is formed on the rear side relative to the axial stop 41 for the axle connection part 37 and therefore strengthens the axial stop 41.

The housing 27 has a tubular basic shape with a radial indentation 47 on the end side in which a cap 49 of the adjustable damping valve 29 engages. The free space which accordingly results for the cap 49 allows a simple cylindrical clamping surface 51 at the axle connection part 37. An inner diameter enlargement at the axle connection part 37 is obviated in this way.

In addition, the axle connection part 37 has an annular base 53 that covers a portion of the cap 49. Accordingly, the adjustable damping valve 29 is substantially protected against external mechanical influences. The cap 49 is in turn sealed relative to the housing 57 by a seal 55 so that no moisture can penetrate into the adjustable damping valve 29. The constructional design of the adjustable damping valve 29 is secondary. The diagram is to be considered merely as an example. Reference is made to DE 10 2015 200 348 A1 as regards the specific construction and manner of operation.

The stationary component parts of the adjustable damping valve 29 are held by a clamping ring 57, and the adjustable damping valve 29 is fixed to a shoulder 59 of the outer housing 47 by the axial preloading of the clamping ring 57. In this example, the clamping ring 57 is formed by a screw ring. Alternatively, a press ring could also be used.

A rear side of the shoulder 59 forms a supporting surface 61 for a bottom valve body 63 of the vibration damper 1. The supporting surface 61 has a conical basic shape so that the bottom valve body 63 is centered automatically during assembly.

The bottom valve body 63 has a central through-opening 65 between the work chamber 11 remote of the piston rod and the adjustable damping valve 29. Accordingly, a direct incident flow of the adjustable damping valve 29 is benefitted and flow noises are minimized.

The bottom valve body 63 is a component part of a check valve 67 that allows damping medium to flow out of a compensation space 69 into the work chamber 11 remote of the piston rod again during an extension movement of the piston rod 3. For this purpose, the bottom valve body 63 has through-channels 71 on a pitch circle that forms the moveable part of the check valve 67 by a valve disk 73 in connection with at least one closing spring 75. A stop disk 77 for the check valve 67 is connected in a rivet-like manner via a sleeve portion 79 through the through-opening 65 to the bottom valve body 63 in a positive engagement to limit the lifting movement of the at least one valve disk 73. Consequently, the bottom valve and check valve 67, respectively, can be preassembled independently from the adjustable damping valve 29.

The bottom valve body 63 has a connection piece 81 for the connection between the bottom valve body 63 and the adjustable damping valve 29, which connection piece 81 enters into a flow connection and holding connection with the adjustable damping valve 29.

The assembly of the vibration damper 1 substantially corresponds to the principles of a conventional vibration damper without adjustable damping valve 29, since the adjustable damping valve 29 forms the base of the adjustable vibration damper 1 with the housing 27. As has already been stated, the adjustable damping valve 29 can be preassembled independently from the other components of the vibration damper 1 so that the housing can be processed with the adjustable damping valve 29 in the manufacturing process instead of a simple sheet metal base.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A vibration damper comprising:
an outer receptacle of the vibration damper having an end;
at least one adjustable damping valve having an outer housing connected to the end of an outer receptacle of the vibration damper,
wherein a longitudinal axis of the at least one adjustable damping valve and a longitudinal axis of the vibration damper run parallel, wherein the outer housing of the at least one adjustable damping valve comprises a clamping surface configured for an axle connection part; and a clamping ring configured to hold the at least one adjustable damping valve, wherein an axial preloading of the clamping ring fixes the at least one adjustable damping valve to a shoulder of the outer housing.

2. The vibration damper according to claim 1, further comprising:

a supporting surface for a bottom valve body of the vibration damper formed by a rear side of the shoulder.

3. The vibration damper according to claim 2, wherein the bottom valve body comprises a central through-opening between a work chamber and the at least one adjustable damping valve.

4. The vibration damper according to claim 3, further comprising:

a stop disk for a check valve connected to the bottom valve body through the central through-opening via a sleeve portion.

5. The vibration damper according to claim 2 wherein the bottom valve body comprises a connection piece having a flow connection and a holding connection to the at least one adjustable damping valve.

6. The vibration damper according to claim 1, wherein the outer housing comprises an axial stop for the axle connection part.

7. The vibration damper according to claim 6, wherein the outer housing is welded to the outer receptacle, and wherein a weld seam is formed on a rear side relative to the axial stop for the axle connection part.

8. The vibration damper according to claim 1, wherein the outer housing has a radial indentation in which a cap of the at least one adjustable damping valve engages.

9. The vibration damper according to claim 8, wherein the axle connection part has an annular base that covers at least a portion of the cap.

* * * * *